United States Patent

[11] 3,629,966

[72] Inventor  Venancio D. Sanchez
       P.O. Box 1544, Charlotte, N.C. 28202
[21] Appl. No. 39,933
[22] Filed    May 22, 1970
[45] Patented Dec. 28, 1971

[54] FISHING LINE STORAGE AND RELEASE DEVICE
     10 Claims, 8 Drawing Figs.
[52] U.S. Cl. .................................................. 43/25,
                                                          43/43.11
[51] Int. Cl. ...................................................... A01k 97/00
[50] Field of Search ........................................... 43/25, 25.2,
                                                          43.11

[56]             References Cited
           UNITED STATES PATENTS
3,159,941  12/1964  Seymour .................... 43/43.11
3,199,242   8/1965  Holmstrom.................. 43/25
3,499,242   3/1970  Tucker, Sr................... 43/25

Primary Examiner—Lucie H. Laudenslager
Attorney—Parrott, Bell, Seltzer, Park & Gibson ABSTRACT: A line storage device for use with a fishing rod or the like and which is designed to store a predetermined length of line in front of the reel. The device includes a releasable guide element for releasing the line as slack upon the application of a predetermined tension on the line as would occur when a fish strikes the bait.

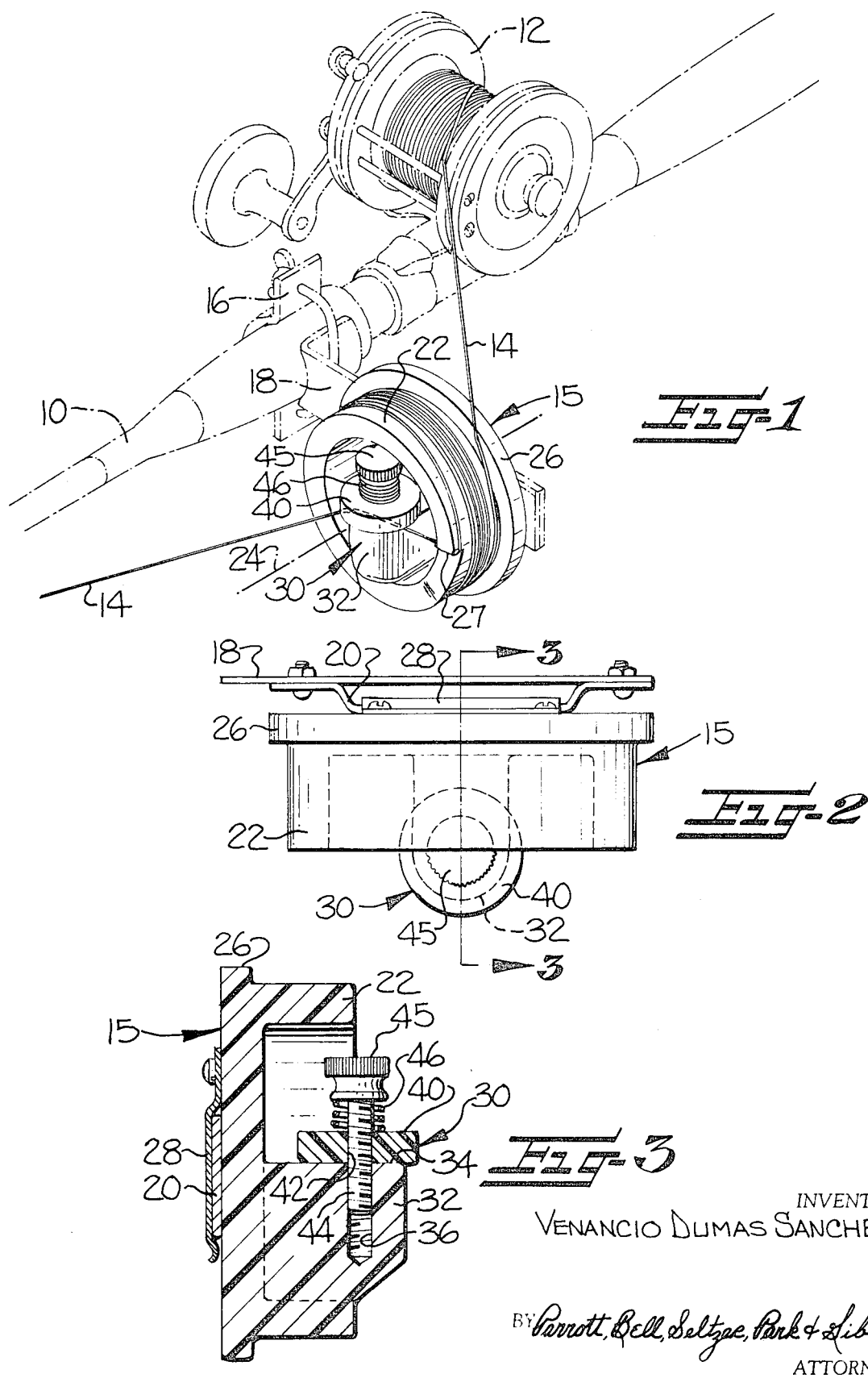

INVENTOR:
VENANCIO DUMAS SANCHEZ

BY Parrott, Bell, Seltzer, Park & Gibson
ATTORNEYS

FISHING LINE STORAGE AND RELEASE DEVICE

The present invention relates to a fishing appliance useful when trolling, and which is capable of storing a predetermined length of line and releasing the same as slack upon a fish striking the bait.

It has been learned that many fish prefer to strike the bait before devouring it, and thus when trolling, it is desirable to allow the fish to swim freely with the bait for an interval of time before tension is developed on the line. With this procedure, the fish is much more likely to become securely hooked than in the case where the line remains taut after the initial strike at the bait, and the hook is jerked immediately thereafter.

To accomplish the above objective, it is common to employ an outrigger which extends outwardly from the boat to store the slack line, and which utilizes a clip to release the line upon a strike. While this device is generally satisfactory in use, it requires the purchase of relatively expensive special equipment and boat mountings.

It has also previously been proposed to employ a line storage and release device which is designed to be permanently secured to the reel of the fishing rod by screws or bolts. Such devices generally include an elongated guide finger which extends radially beyond a storage spool, and the finger includes a rotatable roller at the remote free end for guiding the line from a storage pool to the eyes of the rod. The finger is pivotable from its radial position into a generally axial direction so as to release the line from the spool upon a sudden pull on the line.

The latter-type storage and release device suffers from several disadvantages which have precluded its general acceptance by fishermen, among which is the fact that the device is designed to be permanently secured to the reel and requires the drilling of holes through the reel flanges. Thus the reel must be permanently defaced in order to utilize the storage device. Also, the line easily slides from the roller at the free end of the extended guide finger upon momentary loss of tension in the line to prematurely release the stored line. In addition, the finger remains extended in an axial direction after release, and can easily foul the line as it is withdrawn from the spool, or as the line is being reeled in. Still further, the extended guide finger is rather unsightly, and could easily catch in the fisherman's clothing or surrounding gear.

It is accordingly an object of the present invention to provide a releasably mounted line storage device which may be easily attached to and removed from either a fishing rod or a boat.

It is a further object of this invention to provide a line storage device which may be easily and temporarily attached to a fishing rod without defacing the same.

It is another object of the present invention to provide a line storage device having a release element which will retain the line under momentary loss of tension, and which is designed to minimize the opportunity for fouling the line.

It is still another object of this invention to provide a simplified, inexpensive and compact line storage and release device which may be attached directly to the fishing rod or to some part of the boat, and which incorporates a variable biasing means for adjusting the force required to actuate the release element to compensate for differing boat speeds, bait sizes, and the type of fish being sought.

These and other objects and advantages of the present invention are achieved in the embodiment illustrated herein by the provision of a line storage device which comprises a cylindrical spool having an abutment positioned adjacent its forward axial end for guiding a line wound on the spool from a tangential to a radially inward direction. A releasable guide element is positioned adjacent the central axis of the spool and includes a detent for guiding the line into an axial direction. The detent normally holds the line but is translatable by a predetermined axial force to release the line from the guide element and the spool. Adjustable biasing means is provided for adjusting the holding force of the detent and thus also the force required to release the detent. A spring clip is mounted at the rear end of the spool and is adapted to detachably mount the spool to a cooperating bracket.

Some of the objects and advantages of the present invention having been stated, others will appear as the description proceeds, when taken in connection with the accompanying drawings, in which —

FIG. 1 is a perspective view of a line storage device embodying the present invention and attached to a fishing rod;

FIG. 2 is a top plan view of the line storage device shown in FIG. 1;

FIG. 3 is a sectional side view taken substantially along the line 3—3 of FIG. 2;

Figure 4:
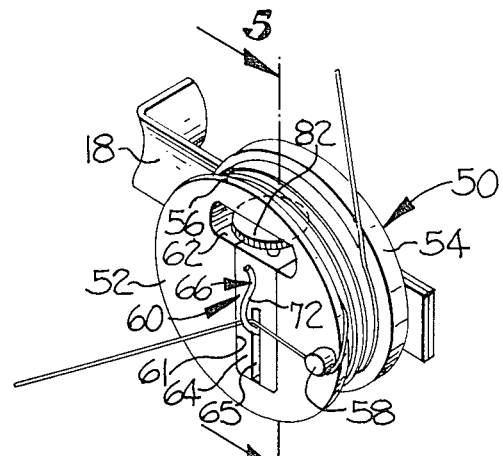
FIG. 4 is a perspective view of a second embodiment of the present invention.

Referring more specifically to the drawings, a fishing rod 10 having an attached reel 12 and line 14 is illustrated in dashed lines in FIG. 1. A line storage device incorporating the features of the present invention is illustrated generally at 15, and is attached to the rod by a suitable clamp 16 which includes the plate 18 and retaining bracket 20. The storage device 15 may be fabricated from an integral molded plastic body and comprises a tubular spool 22 having a cylindrical outer surface defining a central axis 24, and a circular transverse flange 26 positioned at the rear axial end of the spool and extending radially beyond the circumference of the spool 22. The forward axial end of the spool 22 includes an abutment in the form of a V-shaped cutout or notch 27 for the purposes hereinafter described. A metallic spring clip 28 is mounted by suitable screws or the like to the rear face of the flange 26 for detachably mounting the device 15 to the cooperating bracket 20.

A releasable guide element is indicated generally at 30 and includes an integral fixed post 32 positioned radially within the outer surface of the spool 22. The post includes a transverse face 34 lying in a plane generally parallel to the line of the central axis 24, and a threaded aperture 36 extending generally perpendicular to the central axis 24 and the transverse face. Detent means in the form of a pad 40 having a central opening 42 is carried adjacent the face 34, and a threaded member 44 having a manually grippable head 45 extends freely through the opening 42 and into threaded engagement with the aperture 36 to retain the pad on the post. A spring 46 is coaxially mounted on the threaded member beneath the head thereof to resiliently bias the pad 40 against the transverse face 34. Thus by rotation of the threaded member 44, the degree of pressure between the pad and transverse face may be adjusted.

In operation, the line 14 from the reel 12 is wound about the spool 22 a number of times to provide the desired amount of slack. The end of the line 14 is then passed over the notch 27 which serves to guide the line from its tangential to a radially inward direction. The line is then directed between the pad 40 and transverse face 34, and axially outwardly through the eyes of the rod (not shown) and to the bait. During normal trolling, the line remains taut, but the tension will be insufficient to overcome the frictional engagement of the pad 40 and face 34 to thereby release the line. However, when a fish strikes the bait, the tension momentarily increases to overcome the frictional engagement and release the line from between the face and pad, and the slack line is released from the spool. By adjustment of the threaded member 44, the degree of pressure and thus the frictional engagement between the pad and face, can be adjusted so as to release the line upon different degrees of line tension. Thus the releasable guide element may be readily adjusted for varying trolling speeds, bait sizes, and the type of fish being sought.

While the device 15 has been illustrated as being attached to a conventional fishing rod 10, it will be apparent that the device could be attached directly to a boat by use of a similar cooperating bracket 20 mounted for example on the boat transom.

Figure 5:
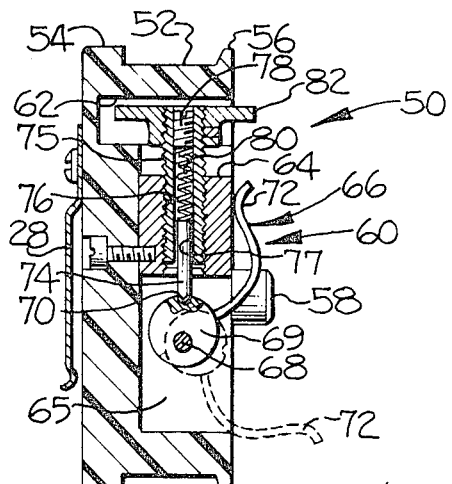
FIG. 5 is a sectional side view taken substantially along the line 5—5 of FIG. 4.

A second embodiment of the present invention is illustrated in FIGS. 4-5. In this embodiment, the storage device is generally indicated at 50, and includes a similar integral molded plastic body comprising a cylindrical spool 52 having rear and forward circular transverse flanges 54 and 56 respectively to facilitate retention of the line wound on the spool. An abutment in the form of an axially extending post or pin 58 is provided adjacent the forward end of the spool for guiding the line 14 from the surface of the spool radially inwardly.

The releasable guide element is indicated generally at 60 and is suitably mounted and retained in a pair of perpendicular slots 61 and 62 adjacent the center of the body. The guide element generally comprises a rectangular metallic insert 64 which includes a forwardly facing radial slot 65 in which is mounted a detent or hook 66. The hook is mounted for translation about the pin 68 which extends generally perpendicular to the spool central axis such that the hook may be translated between a first operative position (shown in solid lines in FIG. 5) adapted to retain a guided line and a second released position (dashed lines in FIG. 5) adapted to release a guided line. The hook itself includes an eccentric cam portion 69 having a peripheral locking notch 70, and an arcuately curved wire 72 emanating from the cam.

To retain the hook 66 in its operative position, resilient biasing means comprising a spring loaded pin 74 is provided. More particularly, the biasing means includes a threaded member 75 mounted in a threaded aperture 76 which extends radially inwardly toward the spool central axis. The threaded member 75 has a central bore 77 which is closed at the upper end by a threaded plug 78 and which mounts a spring 80 as well as the pin 74. A knob 82 is suitably attached to the upper end of the threaded member and extends into the slot 62 so as to be rotatable by hand. By design, the pin 74 is positioned to engage the peripheral surface of the cam 69, and when the hook 66 is translated to its operative position, the pin 74 engages the notch 70. Thus in order to release the hook, a sufficient axial force must be exerted to overcome the engagement between the pin 74 and notch 70. By rotating the knob 82, the degree of compression in the spring 80 is varied, and thus the tension required to release the hook may be adjusted.

Figure 6:
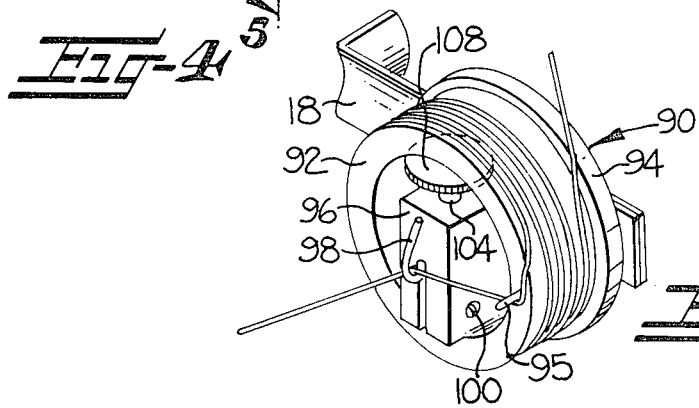
FIG. 6 is a perspective view of still another embodiment of the present invention.
Figure 7:
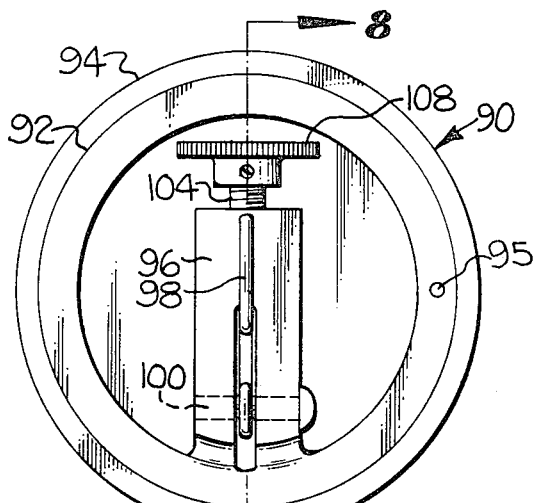
FIG. 7 is a front elevational view of the device illustrated in FIG. 6.
Figure 8:
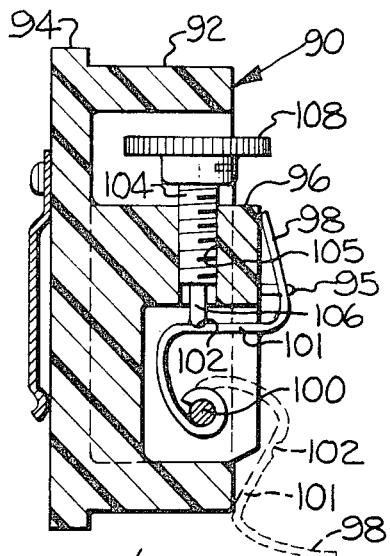
FIG. 8 is a sectional side view taken substantially along the line 8—8 of FIG. 7.

In the embodiment illustrated in FIGS. 6-8, the storage device 90 includes a tubular spool 92, a rear transverse flange 94, abutment means or pin 95 for guiding the line radially inwardly, and an integral central post 96. A detent in the form of a resilient arcuate wire hook 98 is mounted for rotation about the pin 100 between its first operative position (shown in solid lines in FIG. 8) and a second released position (shown in dashed lines in FIG. 8). The hook includes a resilient transverse segment 101 intermediate the ends, and a notch 102 on the outer surface thereof. A threaded member 104 is mounted in a radially directed threaded aperture 105 in the post 96, and includes an integral forward pin 106 adapted to engage the notch 102 to retain the hook in its operative position. The threaded member 104 includes a knob 108 secured at its upper end so that the threaded member may be rotated by hand to increase or decrease the resilient biasing force in the engagement between the pin 106 and notch 102. As will be apparent, the axial force required to translate the hook 98 from its operative to its released position increases as the biasing force increases. Thus by appropriate rotation of the knob 108, the axial force on the line 14 required to release the hook 98 may be adjusted.

In the drawings and specification, there have been set forth preferred embodiments of the invention, and although specific terms are employed, they are used in a generic and descriptive sense only and not for purposes of limitation.

I claim:

1. A line storage device for use with a fishing rod or the like and which is adapted to automatically release the line upon a predetermined tension being applied thereto, said device comprising, a spool having a cylindrical outer surface adapted to receive a number of turns of line to thereby store a predetermined length of line wound thereabout, said spool cylindrical surface defining a central axis and including a rear axial end and a forward axial end, abutment means positioned adjacent the forward axial end of said spool cylindrical surface for guiding a line wound on the spool from a tangential to a radially inward direction, detent means positioned adjacent said spool central axis for guiding a line extending radially inwardly from said abutment means into an axial direction and for normally holding the line therein but releasing the same upon a predetermined axial force being applied thereto, and adjustable biasing means for varying the holding force applied to the line and thereby varying the force required to release a line from said detent means.

2. A line storage device as defined in claim 1 further including a circular flange positioned at the rear axial end of said spool and extending radially beyond the circumference of said spool cylindrical surface to facilitate retention of a line wound on the spool, and a spring clip mounted on said circular flange, said clip being adapted to detachably mount said device on a cooperating bracket.

3. A line storage device as defined in claim 2 wherein said abutment means comprises a V-shaped notch in the cylindrical surface of said spool.

4. A line storage device as defined in claim 2 wherein said abutment means comprises a pin mounted immediately adjacent the cylindrical surface of said spool and extending in a generally axial direction.

5. A line storage device as defined in claim 1 wherein said detent means comprises a post having transverse face, and a pad mounted adjacent said transverse face for limited movement in a direction substantially perpendicular to said face.

6. A line storage device as defined in claim 5 wherein said detent means further comprises a threaded aperture extending into said post and perpendicular to said transverse face, an opening through said pad, a rotatable threaded member extending freely through said opening and into said threaded aperture, and said biasing means includes a spring operatively connected between said threaded member and said pad to resiliently press said pad into engagement with the transverse face, whereby the pressure between the pad and transverse face may be adjusted by rotation of the threaded member.

7. A line storage device as defined in claim 1 wherein said detent means includes a wire hook mounted for rotation about a second axis perpendicular to said central axis between a first position adapted to retain a guided line, and a second position adapted to release a guided line, a locking notch in a peripheral portion of said wire hook, and said biasing means includes a pin adapted to resiliently engage said notch when said wire hook is positioned in said first position to releasably hold said hook in such position.

8. A line storage device as defined in claim 1 wherein said detent means includes a wire hook mounted for rotation about a second axis perpendicular to said central axis and between a first position adapted to retain a guided line and a second position adapted to release a guided line, said wire hook including a cam surface eccentrically positioned about said second axis and including a notch therein, and said biasing means includes a threaded member mounted to extend in a direction perpendicular to said second axis and including a spring biased pin carried at the forward end thereof, said pin being adapted to engage said cam surface and enter said notch when said hook is rotated to its first position to releasably hold the hook in such position, said threaded member being manually rotatable to axially advance the same and thereby adjust the pressure between said pin and cam surface.

9. A line storage device as defined in claim 1 wherein said detent means includes a wire hook mounted for rotation about a second axis perpendicular to said central axis and between a first position adapted to retain a guided line and a second position adapted to release a guided line, said wire hook being arcuately curved and including a resilient transverse segment intermediate the ends thereof, said transverse segment including a notch on the outer surface thereof, and said biasing means includes a threaded member mounted to extend in a direction perpendicular to said second axis and including a pin at the forward end thereof, said pin being adapted to engage said transverse segment of said wire hook and enter said notch when said hook is rotated to its first position to releasably hold said hook in such position, said threaded member being manually rotatable to axially advance the same and thereby adjust the pressure between said pin and said transverse segment.

10. A line storage device for use with a fishing rod or the like and which is adapted to automatically release the line upon a predetermined tension being applied thereto, said device comprising a tubular spool having a cylindrical outer surface adapted to receive a number of turns of line to thereby store a predetermined length of line wound thereabout, said spool outer surface defining a central axis and having a rear axial end and a forward axial end, a notch in said spool outer surface at the forward end thereof for guiding a line wound on the spool from a tangential to a radially inward direction, and a releasable guide element positioned adjacent the spool central axis and including a post terminating in a transverse face, a threaded bore extending into said transverse face, a rotatable threaded member having an enlarged head mounted in said threaded bore, a pad carried by said threaded member immediately adjacent said transverse face, and a spring coaxially carried by said threaded member between said pad and said head for resiliently biasing said pad into engagement with said face.

* * * * *